United States Patent [19]

Garner

[11] 3,890,092

[45] June 17, 1975

[54] FLAME-RETARDANT MATERIAL AND PROCESS

[75] Inventor: Albert Y. Garner, Yellow Springs, Ohio

[73] Assignee: Monsanto Research Corporation, St. Louis, Mo.

[22] Filed: Oct. 26, 1973

[21] Appl. No.: 410,051

[52] U.S. Cl............ 8/115.6; 117/136; 117/138.8 F; 117/138.8 R; 117/138 N; 260/2.5 FP; 260/45.9 NP
[51] Int. Cl............................................ C08g 51/56
[58] Field of Search..... 260/45.9 NP, 551 P, 927 N, 260/2 P, 2.5 FP; 8/115.6

[56] References Cited
UNITED STATES PATENTS 2,782,133  2/1957  Vallette........................... 106/15 FP
3,549,307  12/1970  Hirsch................................... 260/65
3,607,798  9/1971  Hirsch............................. 260/78 SC
3,711,542  1/1973  Hook et al..................... 260/459 NP Primary Examiner—V. P. Hoke
Attorney, Agent, or Firm—Bruce Stevens

[57] ABSTRACT

Aminocyclophosphazene is used to treat polybenzimidazole material, aromatic polyimide and aromatic polyamide material to improve the flame-retardancy thereof. Material is defined to include foams, fibers, yarns, cloth and the polymers per se in any form. Conveniently the material can be treated with an aqueous solution of aminocyclophosphazene and dried. Then the treated and dried material is cured at a sufficient temperature to bond the aminocyclophosphazene to the material. Alternatively the drying and curing can be accomplished as a single operation.

18 Claims, No Drawings

FLAME-RETARDANT MATERIAL AND PROCESS

CROSS-REFERENCE TO RELATED APPLICATION

On June 25, 1973 commonly assigned application was filed as Ser. No. 373,521, teaching the use of aminocyclophosphazene to make flame-retardant polyester cotton material.

BACKGROUND OF THE INVENTION

1. Field of the Invention — Fireproofing.
2. Prior Art — CHEMTECH, the Innovator's Magazine in March, May and July 1973 contains a paper in three parts on Flame Retardant Fabrics by Burton M. Baum. In the first part of this paper in March beginning on page 169 fibers made from high performance polymers are described and among these high performance fibers are aromatic polyamide fibers such as Nomex (DuPont), PBI (U.S. Air Force — Celanese) which are polybenzimidazole fibers (poly-m-phenylene dibenzimidazole) and Durette (Monsanto) which is a modified aromatic polyamide fiber. All of these high performance fibers without additional treatment are fire-resistive in air. However, in high oxygen atmosphere such as in the Space Program, these fabrics are not sufficiently flame-retardant. The present invention involves a treatment of these high performance polymers with aminocyclophosphazene to improve the flame-retardancy thereof.

Aminocyclophosphazene was long ago (1957) patented (U.S. Pat. No. 2,782,133) for fireproofing cellulosic fibers such as cotton, but apparently has not been or is not presently being used commercially for this purpose. It is clear from the CHEMTECH articles referred to in the previous paragraph that there is no predictability as to flame-retardants, and a flame-retardant useful for one fabric may be completely ineffective on another. Also it is clear from the CHEMTECH articles that there is no predictability on fiber blends for flame-retardants. Recently, U.S. Pat. No. 3,711,542 issued teaching certain new N-methylol phosphazene compounds and their use as flame retardants on cotton, and this patent under Background of the Invention contains a summary of certain phosphazene prior art on flame-proofing.

SUMMARY OF THE INVENTION

Aminocyclophosphazene is used to treat polybenzimidazole material, aromatic polyimide and aromatic polyamide material to improve the flame-retardancy thereof. Material is defined to include foams, fibers, yarns, cloth and the polymers per se in any form. Conveniently the material can be treated with an aqueous solution of aminocyclophosphazene and dried. Then the treated and dried material is cured at a sufficient temperature to bond the aminocyclophosphazene to the material. Alternatively, the drying and curing can be accomplished as a single operation.

DESCRIPTION OF THE PREFERRED EMBODIMENTS

Aminocyclophosphazene can be prepared in the following manner:

A solution of 5 pounds of a mixture of 80 percent by weight $(PNCl_2)_3$ and 20 percent by weight $(PNCl_2)_4$ in 2.5 gallons of toluene was run as rapidly as possible into 4 liters of liquid ammonia in a 22-liter, 4-necked, round bottomed flask with stirring. The rate of addition was monitored by the expulsion of ammonia from the top of the Dry Ice condenser used to contain the gas. After the complete addition, the mixture was stirred, and the ammonia was contained for 5 hours. The excess ammonia was allowed to evaporate overnight.

To remove the ammonium chloride, 8 liters of 90 percent aqueous methanol were added. This mixture was stirred for an hour. The precipitate was allowed to settle, and the supernatant liquid was withdrawn by vacuum. The solids were washed subsequently with 50 liters of 95 percent methanol in 10-liter batches. During this wash period, the solids were removed from the flask, because a large cake had formed on one side. The cake was broken up and washed with the rest of the material. After filtration and air drying overnight, the product weighed 1319 g (87.7%). The infrared spectrum taken as a KBr disc indicated very little if any ammonium chloride.

Polybenzimidazole and aromatic polyamide materials and the structures thereof are described in CHEMTECH, March 1973, page 169 as noted hereinabove under Prior Art. Aromatic polyamide material treated with $POCl_3/POBr_3$, chlorine and bromine are described in U.S. Pat. Nos. 3,549,307 and 3,607,798.

The cloth samples were tested for flammability by clamping 4 inch × 2 inch strips vertically over a hot wire coil through which a room temperature vulcanizable (RTV) silicone rubber bar or tissue paper roll was inserted. For those tests at high oxygen atmospheres, the entire assembly was enclosed in a bell jar that was evacuated and brought to the proper atmosphere by the influx of oxygen. The coil was activated electrically to kindle the silicone or paper ignitor which in turn ignited the cloth. The distance and time of burn of the cloth was noted. If the flame extinguished before traveling the entire length of the sample, the sample was termed self-extinguishing.

EXAMPLE 1

A sample of 9.0129 of polybenzimidazole light weight twill was washed and dried and soaked in a 7 percent solution of aminocyclophosphazene in water. The excess solution was removed by passage of the treated cloth through a rubber-rollered wringer. The cloth was cured wet at 150°C. for 10 minutes and weighed 9.5705 g for a gain of 0.5576 g (6.19%).

This treated material was laundered using regular detergent and a 1 hour cycle. Dried weight after laundering was 9.2796 g for a final gain of 0.2667 g (2.96%).

A 4inch strip of this fabric self-extinguished in 1⅞ inch in 31 seconds at pressure of 6.2 psia in 70 percent oxygen and 30 percent nitrogen atmosphere with ignition by a silicone bar that was fired by a hot wire.

A 9.7851 g sample of a heavier twill of polybenzimidazole picked up 0.6512 g (6.65%) of aminocyclophosphazene before laundering and after laundering the weight was 10.1518 g for a final gain of 0.3667 g (3.75%).

A 4 inch strip of this heavier treated material self-extinguished in 1¾ inch in 94 seconds at 6.2 psia, 70 percent oxygen and 30 percent nitrogen, using silicone ignition.

The Oxygen Index* of this treated cloth was 54.2. ,6
*ASTM D-2863-20. Oxygen Index is the minimum concentration of oxygen, expressed as percent by volume, in a mixture of oxygen and nitrogen which will just support combustion of the material under conditions of this method.

EXAMPLE 2

A 4 inch strip of polybenzimidazole twill was washed to remove the antistatic agent and dried. This material burned completely at 5 psia, 70 percent oxygen and 30 percent nitrogen with some shrinkage in 14 seconds using silicone ignition.

Another strip of this cloth self-extinguished at 0.5 inch in 11 seconds in air using paper ignition.

The Oxygen Index of this untreated cloth was 39.2.

EXAMPLE 3

A piece of laundered polybenzimidazole twill was treated with bromine at 360°C. with a 9 minute residence time in the reactor and a bromide feed of 9–10 ml/min. The fabric was washed in water and dried.

A 4 inch strip of the brominated fabric self-extinguished at 1¾ inch in 100 seconds at 5 psia, 70 percent oxygen and 30 percent nitrogen, with silicone ignition. At 6.2 psia, 70 percent oxygen and 30 percent nitrogen, the material burned 4 inches in 73 seconds.

EXAMPLE 4

A piece of the same fabric as Example 3 was washed and dried and then treated with $POCl_3/POBr_3$ 50/50 weight ratio reagent at 360°C. for 9 minutes with a feed of 10 ml/min. The $POCl_3/POBr_3$ need not necessarily be in a 50:50 weight ratio, rather only sufficient $POCl_3$ need be present to dissolve the POBr. This fabric was washed and dried.

A 4 inch strip of this material self-extinguished at ¾ inch in 48 seconds at 5 psia, 70 percent oxygen and 30 percent nitrogen, with silicone ignition.

At 6.2 psia, 70 percent oxygen and 30 percent nitrogen the material self-extinguished at 2⅝ inch in 123 seconds, with silicone ignition.

Polybenzimidazole fibers, yarn, foam and other forms of this polymer can be treated to give improved flame-retardancy in a similar manner to the cloth in Examples 1–4.

EXAMPLE 5

This example describes the treatment of an aromatic polyimide foam with aminocyclophosphazene to fireproof it. This particular foam in order to obtain desired properties including strength and uniformity was made from a commercially available foamable molding powder which after initial foaming was shredded to particulate form, additional foamable molding powder was added and the mixture of the particulate foam and molding powder was subjected to heat and pressure in a cylindrical mold to form a porous foam cylinder having a density of about 6 lbs./cu.ft. Aromatic polyimide foams and structure thereof are described in U.S. Pat. No. 3,520,837 and patents discussed therein. A 3.1537 g sample of the aromatic polyimide foam was soaked in a 6 percent solution of aminocyclophosphazene and cured at 190°C. for 15 minutes. Weight 4.1137 g for a gain of 0.9600 (30.4%).

A 2.75 inch strip of this foam self-extinguished at 1.5 inch in 168 seconds at 6.2 psia, 70 percent oxygen and 30 percent nitrogen, using silicone ignition.

This same foam strip was turned over and ignited on the other end with paper ignition. It self extinguished in 1⅞ inches and 196 seconds at 6.2 psia, 70 percent oxygen and 30 percent nitrogen.

A better method of application of the aminocyclophosphazene may be to soak the shredded foam particles and foamable molding powder before heating and pressing into shape. This should give better coverage and should require less of the aminocyclophosphazene for flame-proofing.

Aromatic polyimide fibers, yarns, cloth and other forms of this polymer can be treated to give improved flame-retardancy in a similar manner as the foam.

EXAMPLE 6

A 1.8517 g sample of aromatic polyamide cloth, (Nomex twill) was treated with $POCl_3/POBr_3$ 50:50 reagent at 360°C. for 9 minutes and then was brominated at 330°C. for 4 minutes and 56 seconds. This treated cloth was washed, laundered and dried and then soaked in a solution of 2 g of aminocyclophosphazene in 20 ml of water, dried at 110°C. for 1 hour, cured at 150°C. for 10 minutes, soaked in 4.5 liters of water for 65 hours and was dried at 110°C. for 1 hour. After standing open to the air in the laboratory for 1 hour the sample showed a loss in weight of 0.0087 g.

A 4 inch strip of this cloth burned 1⅝ inches in 84 seconds in 6.2 psia, 70 percent oxygen and 30 percent nitrogen before self-extinguishing, after silicone ignition.

A sample of the same type of material as cited above in this example except rather than being a twill was a loose knit called a Raschel knit was treated in a similar fashion. This material was also tested for fire retardancy. A 4 inch strip of this Raschel knit treated material self-extinguished at 3 inches after burning 100 seconds at 6.2 psia, 70 percent oxygen and 30 percent nitrogen with silicone ignition. A 3 13/16 inch strip of this same treated Raschel knit material self-extinguished at 2⅝ inch after burning for 82 seconds at 6.2 psia, 70 percent oxygen and 30 percent nitrogen with silicone ignition.

EXAMPLE 7

A sample of the twill cloth of Example 6 which had received the $POCl_3/POBr_3$ treatment, but not the bromine treatment was soaked in solution of 2 g of aminocyclophosphazene in 20 ml of water, dried 1 hour at 110°C., cured at 150°C. for 10 minutes, soaked 65 hours in 4.5 liters of water and dried at 110°C. for 1 hour. After an hour at laboratory atmospheric conditions the sample weighed 3.1132 g for a gain of 0.3956 g (14.5%).

A 4 inch strip of this material self-extinguished at 1⅝ inches in 72 seconds at 6.2 psia, 70 percent oxygen and 30 percent nitrogen with silicone ignition. After soaking the treated cloth in a vibrator agitated water bath for 1 hour and drying, a 4 inch strip of this material self-extinguished at 1⅝ inch in 69 seconds at 6.2 psia, 70 percent oxygen and 30 percent nitrogen.

EXAMPLE 8

This example describes the treatment of the same type of cloth as Example 7 in the same way except that rather than being a close knit twill the cloth in Example 8 was an aromatic polyamide pajama cloth previously treated with $POCl_3/POBr_3$. A 1.2609 g sample of the pajama cloth was soaked in a solution of 2 g aminocyclophosphazene in 20 ml of water, dried at 110°C. for 1 hour cured at 150°C. for 10 minutes, soaked in 4.5 liters of water for 65 hours and dried at 110°C. for 1 hour. After standing for 1 hour at room temperature conditions the cloth weighed 1.5465 g for a gain of 0.2856 g (22.6%).

A 4 inch strip of this treated cloth self extinguished at 1⅞ inches in 61 seconds at 6.2 psia, 70 percent oxygen and 30 percent nitrogen, using silicon ignition.

After soaking the cloth in a vibrator agitated water bath for 1 hour and drying at 110°C. a 4 inch strip of this cloth self-extinguished at 1⅝ inches in 55 seconds at 6.2 psia, 70 percent oxygen and 30 percent nitrogen. The flame flashed up 2¼ inches and scorched the sample above the burned distance.

EXAMPLE 9

A sample of aromatic polyamide cloth similar to that of Example 7 except that it is a knit rather than a twill was treated in a manner similar to the cloth of Example 7 with $POCl_3/POBr_3$ and then was treated in the following manner. A 10.0156 g sample of the $POC_3/POBr_3$ treated knit was soaked in a 7 percent solution of aminocyclophosphazene in water. The excess solution was squeezed out with rubber rollers. The sample was dried at 110°C. for 10 minutes and cured at 190°C. for 15 minutes. After hand washing and redrying, the sample weighed 11.4532 g for a gain of 1.4376 g (14.1% gain).

A 4 inch strip of this fabric self-extinguishes at 5/16 inch in 53 seconds at 6.2 psia, 70 percent oxygen and 30 percent nitrogen, using silicone ignition.

EXAMPLE 10

This example describes the treatment of virgin aromatic polyamide duck with aminocyclophosphazene. A 15.3974 g sample of Nomex duck was soaked in a 7 percent solution in water of aminocyclophosphazene and the excess solution was removed with a rubber wringer. The fabric was dried at 110°C. for 10 minutes and cured at 190°C. for 15 minutes. The weight after curing was 18.2725 g for a gain of 2.8751 g (18.68% gain).

A 4 inch strip of this material charred 1¼ inch with self-extinguishment at 6.2 psia, 70 percent oxygen and 30 percent nitrogen, using silicone ignition.

A 16.5038 g sample of the fabric was laundered using regular detergent and a 1 hour cycle. The material now weighs 15.7100 g for a loss of 0.7938 g (5.05% loss). This amounts to a 13 percent add-on remaining.

A 4 inch strip of this laundered material glowed, flamed and charred its entire length in 6.2 psia and 5 psia, 70 percent oxygen and 30 percent nitrogen, with the silicone ignition. The material kept its integrity and did not shrink or buckle.

EXAMPLE 11

An aromatic polyamide twill which had been previously treated with $POCl_3/POBr_3$ solution in a manner similar to Example 7, was washed, dried and soaked in a solution of 15.3 g of a mixture of ammonium/chloride/-aminocyclophosphazene (52%) in 125 ml of water. This treatment is equivalent to treatment with crude unpurified aminocyclophosphazene. The treated fabric was dried at 110°C. for 10 minutes and cured 190°C. for 15 minutes. Weight 9.3707 g for a gain of 0.6488 g (7.44% gain).

This material was machine washed using regular detergent and a 1 hour cycle. Weight 9.2506 g for overall gain of 0.5347 g (6.13% add-on).

A 4 inch strip of this machine washed cloth self-extinguished in ⅝ inch in 32 seconds at 6.2 psia, 70 percent oxygen and 30 percent nitrogen, using silicone ignition.

EXAMPLE 12

This example describes the treatment of an aromatic polyamide twill previously treated with $POCl_3/POBr_3$ in a manner similar to Example 7 wherein the intermediate drying step is eliminated. A 9.5436 g sample of $POCl_3/POBr_3$ treated Nomex twill was washed, dried and soaked in a 7 percent solution of aminocyclophosphazene. The excess solution was removed by squeezing through a rubber-rolled wringer. The cloth was placed in a 190°C. oven and heated for 15 minutes. Weight 10.7729 g for a gain of 1.2293 (12.9%).

The fabric was laundered using regular detergent in a 1 hour cycle. Weight 10.2976 g for a final gain of 0.7540 g (7.9% gain).

A 4 inch strip of this cloth self-extinguished in ⅜ inch at 30 seconds at 6.2 psia, 70 percent oxygen and 30 percent nitrogen, using silicone ignition.

EXAMPLE 13

This example describes the treatment of cloth similarly treated in Example 12 except this aromatic polyamide is pajama cloth rather than a twill as in Example 12. A 4.9598 g sample of the $POCl_3/POBr_3$ treated Nomex pajama cloth was washed, dried and treated with a 7 percent solution of aminocyclophosphazene. The excess solution was removed by passage through a rubber-rollered wringer. The fabric was placed directly into a 190°C. oven for 15 minutes. Weight 5.5776 g for gain of 0.6178 g (12.4% gain).

This material was machine laundered using a 1 hour cycle and regular detergent. Weight 5.4367 g for a final gain of 0.4769 g (9.6%).

A 4 inch strip of this material self-extinguished in 1.5 inch and 44 seconds at 6.2 psia, 70 percent oxygen and 30 percent nitrogen, using silicone ignition.

EXAMPLE 14

This example describes the treatment of an aromatic polyamide twill which had been brominated at 360°C. for 5 minutes, washed and dried. The brominated cloth was soaked in a 6 percent solution of aminocyclophosphazene. The excess solution was squeezed out with a rubber-rollered wringer. The wet cloth was cured at 150°C. for 10 minutes. Weight 2.7227 g for a gain of 0.1681 g (6.57% gain). The cloth was laundered using regular detergent and a 1 hour cycle. Weight 2.6804 g for a final gain of 0.1258 g (4.9%).

A 4 inch strip of this material self-extinguished in ⅞ inch in 12 seconds at 6.2 psia, 70 percent oxygen and 30 percent nitrogen, using silicone ignition. There were some actual spouts of flame and charring before self-extinguishment occurred. The material was golden colored.

The Oxygen Index of the cloth which had been only brominated was 43.8. After the treatment of this cloth with the aminocyclophosphazene, the Oxygen Index was 54.2.

EXAMPLE 15

This example describes the treatment of a 50/50 Nomex polyamide/cotton fabric. At 10.9747 g sample of the 50/50 percent by weight Nomex polyamide/cotton cloth was soaked in a 6% solution of aminocyclophosphazene and cured wet at 150°C. for 10 minutes. Weight 11.7909 g for a gain 0f 0.8162 g (7.45%).

The fabric was machine washed using regular detergent and a 1 hour cycle. Weight 11.6583 g for a final gain of 0.6836 g (6.23% gain).

A 4 inch strip scorched 2⅜ inches with no glow or flame when tested in air with paper ignition. The cloth retained its integrity. The scorched portion was easily torn.

In addition to the 50:50 percent by weight aromatic polyamide/cotton fabric, other fiber blends may be desirable in the range of 30 to 70 percent by weight aromatic polyamide and 70 to 30 percent by weight cotton, and these other fiber blends will be given improved flame-retardancy upon being treated in a similar manner to the 50:50 blend of Example 15.

EXAMPLE 16

A sample of aromatic polyamide Nomex twil previously treated with chlorine for 15 minutes at 305°C., washed and dried was treated with aminocyclophosphazene. A 10.5179 g sample of this chlorine-treated aromatic polyamide was dipped into a solution 6.5 percent aminocyclophosphazene in water and passed through rollers to remove the excess solution. After drying for 10 minutes at 110°C. the sample weighed 11.0235 g for add-on of 0.5056 g (4.81% gain). A sample was taken leaving a piece weighing 10.0214 g. The material burned out only 1⅜ inches in 51 seconds at 6.2 psia, 70 percent oxygen and 30 percent nitrogen, using silicone ignition.

After laundering using detergent the sample weighed 9.8600 g for a loss of 0.1524 g and a total add-on after washing of 3.5 percent.

A 4 inch sample of this laundered material burned 4 inches in 14 seconds at 6.2 psia, 70 percent oxygen and 30 percent nitrogen, using silicone ignition. At 5 psia, 70 percent oxygen and 30 percent nitrogen, using silicone ignition the sample surface flames 3 inches and self-extinguishes in 10 seconds with no after glow. Actual burn out was 0.25 inch from the bottom.

A piece of the aromatic polyamide twill which had been treated with chlorine in a similar fashion as described above in this example, but had not been treated with aminocyclophosphazene burns 4 inches in 17 seconds with complete charring and final after glow consuming the fabric entirely.

Aromatic polyamide foam, fibers, yarn and other forms of this polymer can be treated to give improved flame-retardancy in a similar manner to the cloth in Examples 6–16.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. Although, for convenience an 80/20 trimer/tetramer phosphonitrilic chloride raw material was used in making the aminocyclophosphazene used in the experimental work, both the aminocyclophosphazene trimer and tetramer are effective flame retardants and each can be used if desired, without the other; however, obviously economy dictates the use of the cheaper mixed raw material. Also it must be clear from Example 11 and the description of the making of aminocyclophosphazene prior to the experimental examples that crude aminocyclophosphazene containing the ammonium chloride can be used in the process of the invention. Accordingly, modifications are contemplated which can be made without departing from the spirit of the described invention.

What is claimed is:

1. A process for improving the flame-retardancy of polybenzimidazole material, aromatic polyimide material or aromatic polyamide material comprising treating said material with aminocyclophosphazene in sufficient amount and curing the treated material at a sufficient temperature to improve flame-retardancy in high oxygen atmosphere.

2. A process of claim 1 wherein said material comprises polybenzimidazole foam.

3. A process of claim 1 wherein said material comprises polybenzimidazole fiber.

4. A process of claim 1 wherein said material comprises polybenzimidazole cloth.

5. A process of claim 4 wherein said material comprises polybenzimidazole cloth which has been treated with bromine to improve flame-retardancy prior to said aminocyclophosphazene treatment.

6. A process of claim 4 wherein said material comprises polybenzimidazole cloth which has been treated with $POCl_3/POBr_3$ to improve flame-retardancy prior to said aminocyclophosphazene treatment.

7. A process of claim 1 wherein said material comprises aromatic polyamide foam.

8. A process of claim 1 wherein said material comprises aromatic polyamide fibers.

9. A process of claim 1 wherein said material comprises aromatic polyamide cloth.

10. A process of claim 9 wherein said material comprises aromatic polyamide cloth which has been treated with bromine to improve flame-retardancy prior to said aminocyclophosphazene treatment.

11. A process of claim 9 wherein said material comprises aromatic polyamide cloth which has been treated with chlorine to improve flame-retardancy prior to said aminocyclophosphazene treatment.

12. A process of claim 9 wherein said material comprises aromatic polyamide cloth which has been treated with $POCl_3/POBr_3$ to improve flame-retardancy prior to said aminocyclophosphazene treatment.

13. A process of claim 12 wherein said material comprises aromatic polyamide cloth which has been treated with bromine to further improve flame-retardancy subsequent to said $POCl_3/POBr_3$ treatment and prior to said aminocyclophosphazene treatment.

14. A process of claim 9 wherein said polyamide cloth comprises 30 to 70 weight percent aromatic polyamide and 70 to 30 weight percent cotton cloth.

15. A process of claim 1 wherein said material comprises aromatic polyimide foam.

16. A process of claim 1 wherein said material comprises aromatic polyimide fiber.

17. A process of claim 1 wherein said material comprises aromatic polyimide cloth.

18. A flame-retardant material made by the process of claim 1.

* * * * *